United States Patent [19]

Noto et al.

[11] Patent Number: 4,753,308
[45] Date of Patent: Jun. 28, 1988

[54] ELECTRO-MOTIVE POWER STEERING SYSTEM

[75] Inventors: Yasuo Noto, Katsuta; Noburo Sugiura, Mito; Hideyuki Ouchi, Yokohama, all of Japan

[73] Assignee: Hitachi, Ltd., Tokyo, Japan

[21] Appl. No.: 824,791

[22] Filed: Jan. 31, 1986

[30] Foreign Application Priority Data

Feb. 2, 1985 [JP] Japan ................. 60-19152
Mar. 20, 1985 [JP] Japan ................. 60-57225

[51] Int. Cl.$^4$ ............................. B62D 5/04
[52] U.S. Cl. ..................... 180/79.1; 180/141; 364/424
[58] Field of Search ........... 180/79.1, 79, 141, 142, 180/143; 364/424, 425; 74/388 PS

[56] References Cited

U.S. PATENT DOCUMENTS 4,527,653 7/1985 Agarwal et al. ............... 180/79 X
4,556,116 12/1985 O'Neil ........................... 180/79.1
4,591,014 5/1986 Yasuda .......................... 180/79.1
4,611,682 9/1986 Yasuda et al. .................. 180/79.1

FOREIGN PATENT DOCUMENTS 209471 12/1982 Japan ........................... 180/79.1

Primary Examiner—John J. Love
Assistant Examiner—Mitchell J. Hill
Attorney, Agent, or Firm—Antonelli, Terry & Wands

[57] ABSTRACT

An electro-motive power steering system includes a torque sensor for detecting a steering force exerted to a steering wheel, a motor controlled in accordance with the output of the torque sensor, a steering angle sensor for detecting a steering angle, acceleration/deceleration deciding circuit for deciding based on the outputs of the torque sensor and the steering angle sensor whether the steering of the steering wheel is accelerated or decelerated, and a function generator for generating a function of either one of acceleration or deceleration in accordance with the result of the decision by the acceleration/deceleration deciding circuit, wherein a steering assisting force corresponding to the acceleration or deceleration of the steering of the steering wheel is applied to the steering wheel.

3 Claims, 16 Drawing Sheets

ELECTRO-MOTIVE POWER STEERING SYSTEM

BACKGROUND OF THE INVENTION

The present invention relates to a power steering system for automobiles and the like, and in particular, to a power steering system which provides excellent steering feeling.

In automobiles, users thereof belonging to various classes, the power steering systems are widely equipped from large cars to compact cars, and are serving for reducing the fatigue and for ensuring the safety in driving.

As the power steering systems, heretofore, the hydraulic pressure type has been used primarily. However, in recent years, in view of the utility in providing variety of controls and in wasting less energy, electro-motive type power steering systems have been proposed.

In the electro-motive type power steering systems, such type of systems have primarily been employed in which in order to obtain a large operating force required for an electro-motive type actuator used in the power steering systems, an electric motor is used as this actuator, and its output is retarded to obtain a final operating force for assisting the steering.

However, in the conventional electro-motive type power steering system, the drawback is involved in that since the assisting steering force is provided through a reduction mechanism from the electric motor rotating at a high speed, a characteristic of the power steering system which is very undesirable for the steering feeling appears in the handling of the steering wheel due to an inertia of the electric motor, and due to a large frictional resistance encountered when the electric motor is rotated without energization thereof by exerting a force from the output side of the reduction mechanism.

As to the characteristic which appears in the handling of the steering wheel due to the inertia of the motor, and which is undesirable for the steering feeling, a method of utilizing a differential characteristic in the control of the motor is considered to be useful as proposed, for example, in Japanese Patent Unexamined Publication No. 55-76760 (1980), and this method is expected to provide considerable effects in improving the steering feeling.

However, this method requires a differential circuit and the like, and the provision of the differential characteristic, in turn requires a new countermeasure for noise, and thus an increase in manufacturing cost results. Against the degradation of the steering feeling due to the frictional resistance, no particular improving effect is expected, and as a whole, a satisfactory improvement in the steering feeling can not be obtained. In this respect, this degradation of the steering feeling due to the frictional resistance appears as a significant decrease in a restoring force which is normally present when the steering angle is other than zero (a neutral position), or appears as an extinguishment of the restoring force.

Furthermore, when a steering force is applied to the steering wheel, it is designed that an assisting force is added by the motor. However, since the motor has the inertia, in order to accelerate the motor, the driver has to promote or pull the motor by the steering force exerted by the steering wheel so that inertia energy of the motor proportional to the square of a rotational speed of the motor is added, and also in order to stop the motor, the driver has to assist to stop the motor through the steering wheel. In particular, when the driver tries to turn the steering wheel fast, he will feel a shock at the driver's hands due to a load developed by a delay in time until the motor reaches a required rotational speed. In order to compensate for this load, there is a control circuit which employs the differential characteristic as mentioned earlier. However, this method involves a drawback that since the energy for acceleration and deceleration needed for the motor is not taken into account, the energy which is compensated for by the steering speed is insufficient.

On the other hand, in recent hydraulic type power steering systems, it is proposed to improve the straight advancing performance by providing a restoring force in the power steering system as disclosed in Japanese Patent Unexamined Publication No. 54-90726 (1979). However, there has been entirely no consideration as to how to control the restoring force at the time of forward acceleration, backing, and normal travelling to enable to improve the safety during running and the straight advancing performance of the automobile.

SUMMARY OF THE INVENTION

An object of the present invention is to provide an electro-motive power steering system capable of satisfactorily following a steering speed of the steering wheel.

In the present invention, a motor acceleration/deceleration function according to a motor rotational speed is set, and in response to an increase and a decrease in the steering force of the steering wheel, the motor speed is controlled by using that function thereby to enable to satisfactorily follow the steering speed of the steering wheel.

Further, a movement of the automobile is detected whether it is forward or backward, as well as an amount of acceleration of the vehicle is detected, and a current is supplied to an armature of the motor in accordance with the detected amount of acceleration to provide a restoring force to the vehicle in a direction to make the steering angle of the automobile become zero thereby to improve the straight advancing performance of the automobile at the time of acceleration and to improve the steering performance at the time of backing.

BRIEF DESCRIPTION OF THE DRAWINGS

The invention will become more apparent from the following detailed description of the preferred embodiments with reference to the drawings in which:

FIG. 19 is a circuit diagram of the embodiment;

FIG. 20 is an operation block diagram;

FIG. 21 is a characteristic diagram of a restoring force current with respect to a steering angle;

FIG. 22 is a current limit value-temperature characteristic diagram; and

FIG. 23 is a flowchart of current limit depending on temperature.

DESCRIPTION OF THE PREFERRED EMBODIMENT

Figure 1:
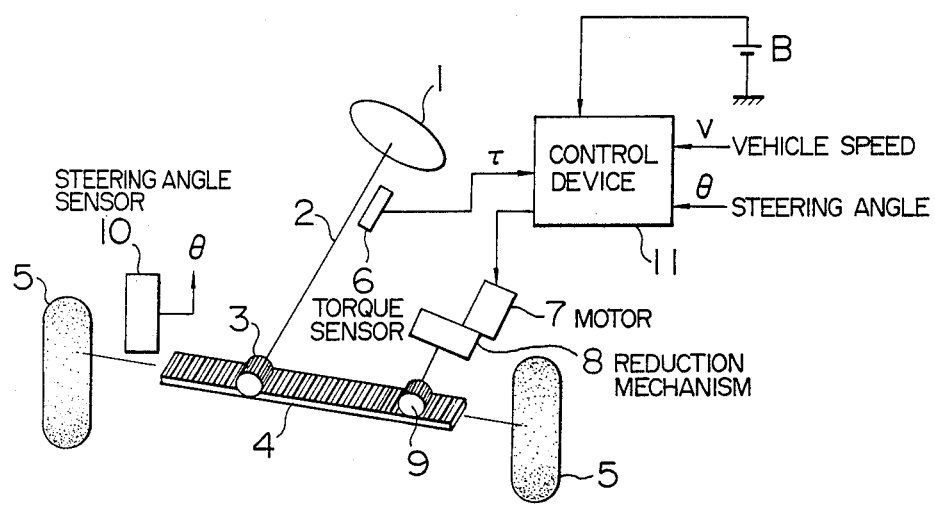
FIG. 1 is a diagram of a system arrangement showing an embodiment of a power steering system in accordance with the present invention.

Hereinafter, a power steering control system in accordance with the present invention will be described in detail by way of embodiments shown in the drawings.

FIG. 1 is an embodiment in which the present invention is applied to an electro-motive power steering system for automobiles, and reference numeral 1 designates a steering wheel, 2 a steering wheel shaft, 3 a pinion, 4 a rack, 5 are tires (wheels) for turning a direction of the automobile, 6 a torque sensor, 7 a motor for power assistance, 8 a reduction mechanism, 9 a pinion, 10 a steering angle sensor, and 11 designates a control device. Further, letter B designates a battery for power supply.

This embodiment is the so-called rack-and-pinion type, and a steering force applied to the steering wheel 1 by the driver is transmitted from the steering wheel shaft 2 to the rack 4 through the pinion 3, and the tires 5 are turned to a predetermined steering angle.

Figure 2:
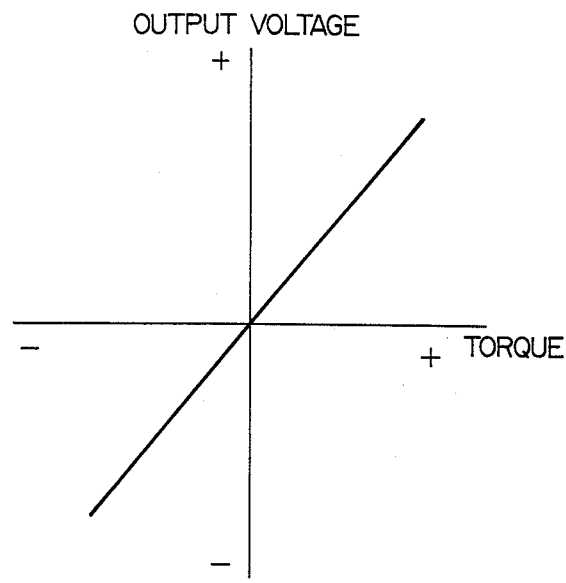
FIG. 2 is a characteristic diagram of the torque sensor in FIG. 1.

The torque sensor 6 detects a torque imparted to the pinion 3 from the steering wheel 1 through the steering wheel shaft 2 when the driver turns the steering wheel 1, and generates a signal τ indicative of the magnitude of the torque. The torque sensor 6 may be, for example, a strain gauge fixed to the steering wheel shaft 2, or may be composed of a torsion spring mechanism provided on the steering wheel shaft 2 and a variable resistor for detecting the amount of torsion, and the torque sensor 6 has a characteristic, for example, as shown in FIG. 2.

The motor 7 operates as an electro-motive type actuator which applies an assisting steering force to the rack 4 through the reduction mechanism 8 comprised of a gear device or the like and through the pinion 9.

Figure 3:
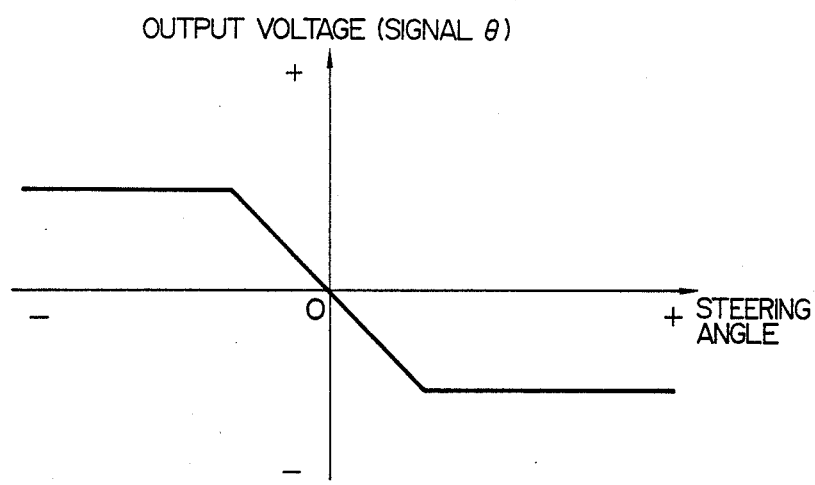
FIG. 3 is a characteristic diagram of the steering angle sensor in FIG. 1.

The steering angle sensor 10 detects a steering angle (a turning angle) of the tires 5, and generates a signal θ representing the steering angle in accordance with a characteristic, for example, as shown in FIG. 3, in which the steering angle is made zero when the automobile is in a straight advancing condition, that is, when the turning angle of the tires 5 is at a neutral position. The steering angle sensor 10 may be constituted by a rotary encoder including a variable resistor or the like which detects an angle of rotation of a member which rotates as the tires 5 are turned, or may be constituted by a linear encoder for detecting a movement of a member in a linear motion as the tires 5 are turned.

Figure 4:
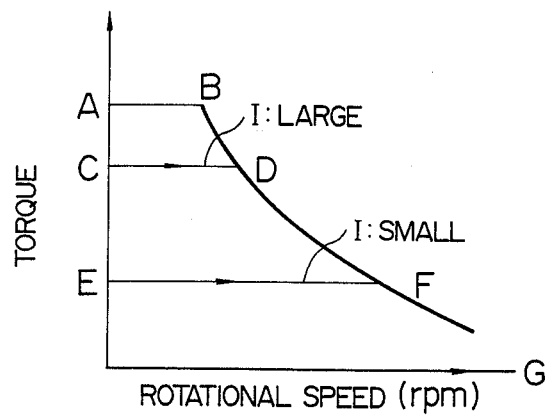
FIG. 4 is a rotational speed-torque characteristic diagram of the motor.

The motor 7 used in this power steering system has a torque-rotational speed characteristic as shown in FIG. 4. With a large armature current I of the motor 7, the torque characteristic changes with respect to the rotational speed from C→D→F→G as shown in FIG. 4. Further, when the armature current I is small, the torque characteristic changes with respect to the rotational speed from E→F→G as shown in FIG. 4.

Figure 5:
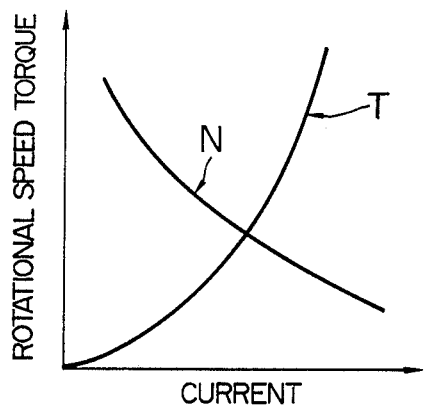
FIG. 5 is an armature current-torque/rotational speed characteristic diagram.

A characteristic of rotational speed and torque with respect to the armature current I of the motor 7 is shown in FIG. 5.

Figure 6:
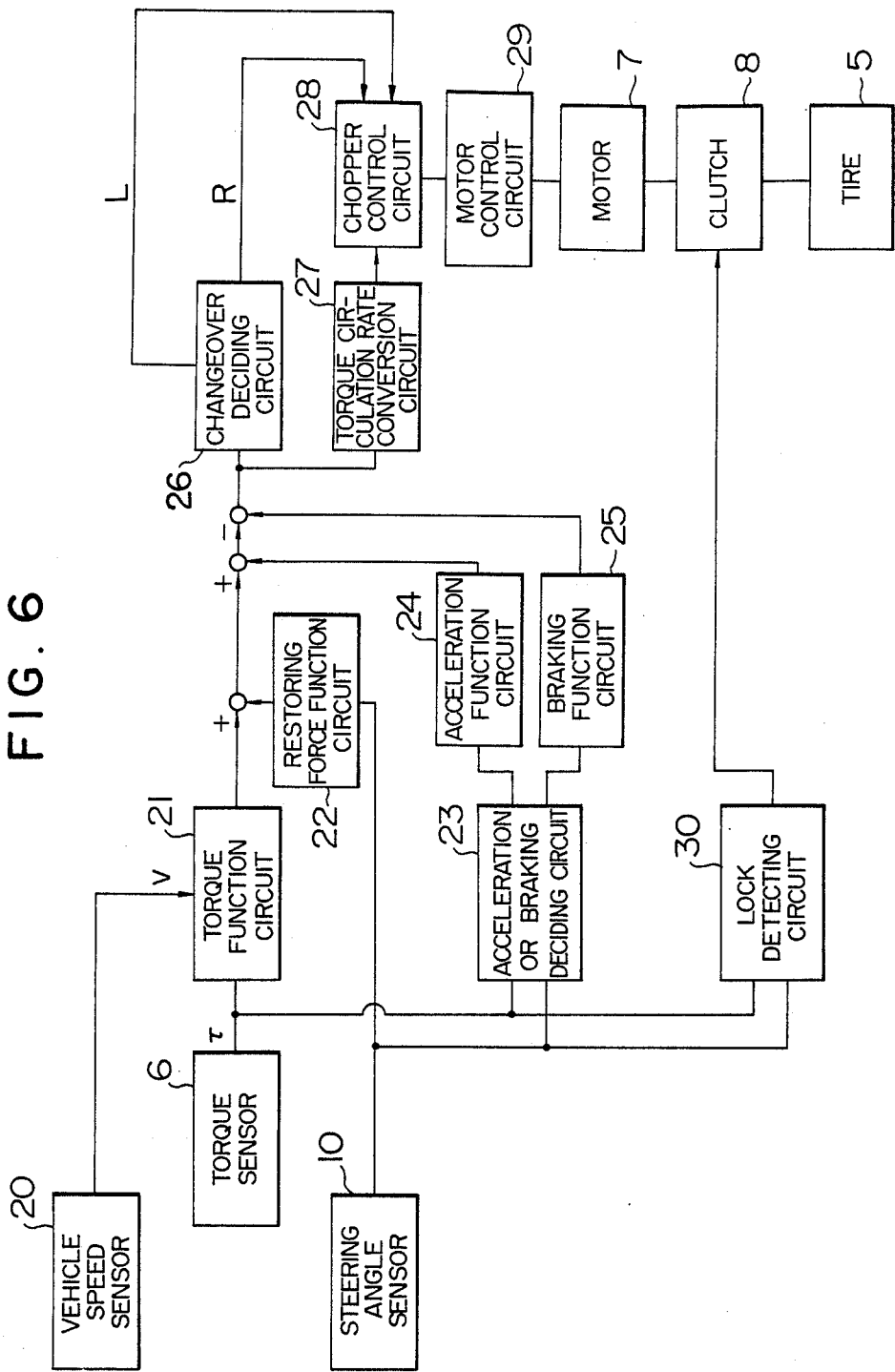
FIG. 6 is a block diagram of an embodiment of the present invention.

FIG. 6 shows an embodiment of the control device 11, and which is composed of a torque function circuit 21, a restoring force function circuit 22, an acceleration or braking deciding circuit 23, an acceleration function circuit 24, a braking function circuit 25, a changeover deciding circuit 26, a torque circulation rate conversion circuit 27, a chopper control circuit 28, a motor control circuit 29, and a lock detecting circuit 30.

Next, the operation will be described.

When the steering wheel 1 is handled by the driver to apply a torque to the steering wheel shaft 2, the torque is detected by the torque sensor 6 in accordance with the characteristic in FIG. 2, and the torque signal τ is outputted.

This torque signal τ is inputted to the chopper control circuit 28 via the torque function circuit 21 and torque circulation rate conversion circuit 27, and the torque signal τ is converted to a pulse signal CP having a duty ratio corresponding to the absolute value of the torque signal τ at that time, and then supplied to the motor control circuit 29. At this time, in the changeover deciding circuit 26, depending on whether the inputted torque signal τ is positive or negative, either one of a clockwise rotation signal R and a counter clockwise rotation signal L is outputted, and these signals R, L are inputted to the motor control circuit 29.

In this respect, the polarity of the torque signal τ generated by the torque sensor 6 is set beforehand such that, for example, the torque which is developed by turning the steering wheel 1 in a clockwise direction is of positive polarity, whereas the torque developed by turning the steering wheel 1 in a counterclockwise direction is of negative polarity. Accordingly, when the torque signal τ is positive, it represents that the automobile is turning to the right, and when the torque signal τ is negative, the automobile is turning to the left.

Next, the torque function circuit 21 will be described. This torque function circuit 21 outputs a torque value corresponding to an amount of correction depending on a rotational speed of the motor 7 so that the correction torque output characteristic assumes characteristics a and b as shown in FIG. 7(A). The output characteristic a in FIG. 7(A) is used when a handling speed of the steering wheel 1 is high, and the output characteristic b is used when the handling speed of the steering wheel 1 is low. The curve c in FIG. 7(A) shows a correction value in the conventional differential type. By adding such a correction torque value, when a steering force is exerted as shown by a curve a in FIG. 7(B), the inertia of the motor 7 can be sufficiently compensated. A curve c in FIG. 7(B) shows a steering force characteristic in the conventional differential type, and the influence due to different inertias depending on the handling speed of the steering wheel 1 can not be eliminated.

Figure 8:
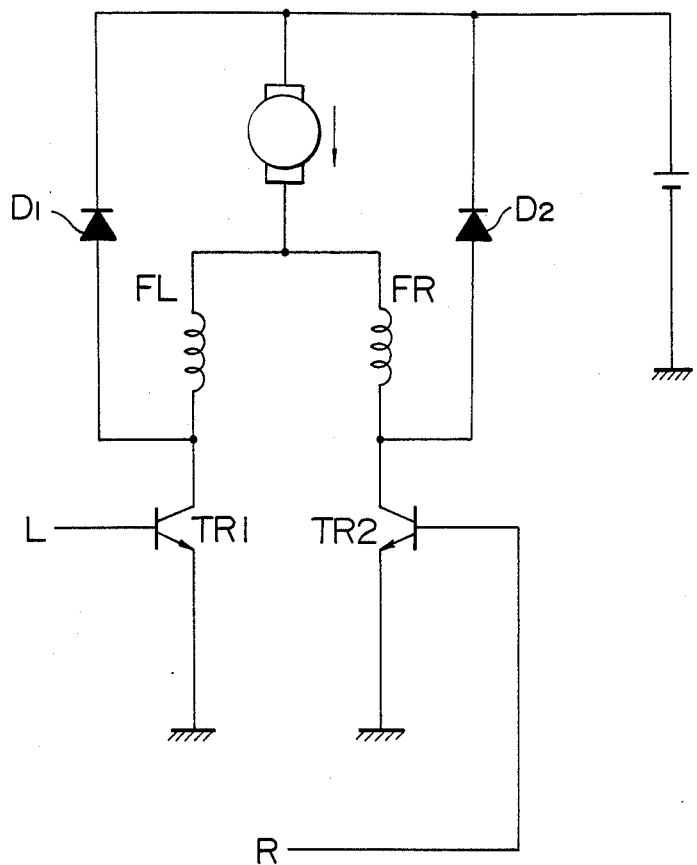
FIG. 8 is a detailed circuit diagram of the motor control circuit of FIG. 6.

In FIG. 8, an embodiment of the motor control circuit 29 is shown, and it is composed of a pair of power transistors TR1 and TR2 (hereinafter, referred to as TR1 and TR2), and a pair of free wheel diodes D1 and D2. The TR1 is supplied with a signal corresponding to the logical product of the counterwise rotation signal L and the pulse signal CP, and the TR2 is supplied with a signal corresponding to the logical product of the clockwise rotation signal R and the pulse signal O. Thus, when the clockwise rotation signal R is present, that is, when the torque signal $\tau$ is positive polarity, the TR2 is turned on, and a current is supplied to the motor 7 in a direction shown by the arrow in FIG. 8, and the magnitude of this current is controlled in accordance with the duty ratio of the pulse signal CP. Conversely, when the torque signal $\tau$ is negative polarity, and the counter clockwise rotation signal I is present, the TR1 is turned on, and the current is supplied to the motor 7 in a direction opposite to the arrow in FIG. 8, and at this time, the current value is controlled similarly by the duty ratio of the pulse signal CP.

And in either case, the magnitude of the current flowing in the motor 7 is detected by a current detector (not shown) and is supplied as a feedback current signal to the chopper control circuit 28, and by such an arrangement, a feedback loop is formed so that a current corresponding to the signal being fed from the torque circulation rate conversion circuit 27 is accurately supplied to the motor 7.

Further, the diodes D1 and D2 serve to provide return paths when the TR1 or TR2 is turned off as a result of the chopper control by the pulse signal CP.

Accordingly, when the driver handles the steering wheel 1, then in accordance with the direction and the magnitude of the operating force (steering force) applied at that time, a current of a predetermined value is supplied to the motor 7 in a predetermined direction, and the torque generated by the motor 7 is imparted to the rack 4 through the pinion 9, and an assisting steering force is developed. As a result, a function as the power steering system can be obtained.

However, if the magnitude of the steering force required for the driver to handle the steering wheel 1 is too small, the driver will find it difficult to drive the automobile smoothly. In this respect, it has been known from experience and the like, that it is desirable for the steering feeling to provide the assisting steering force, that is, to determine the current value of the motor 7 such that the current has a higher order characteristic with an offset portion as shown in FIG. 9 with respect to the signal $\tau$ from the torque sensor 6.

Figure 9:
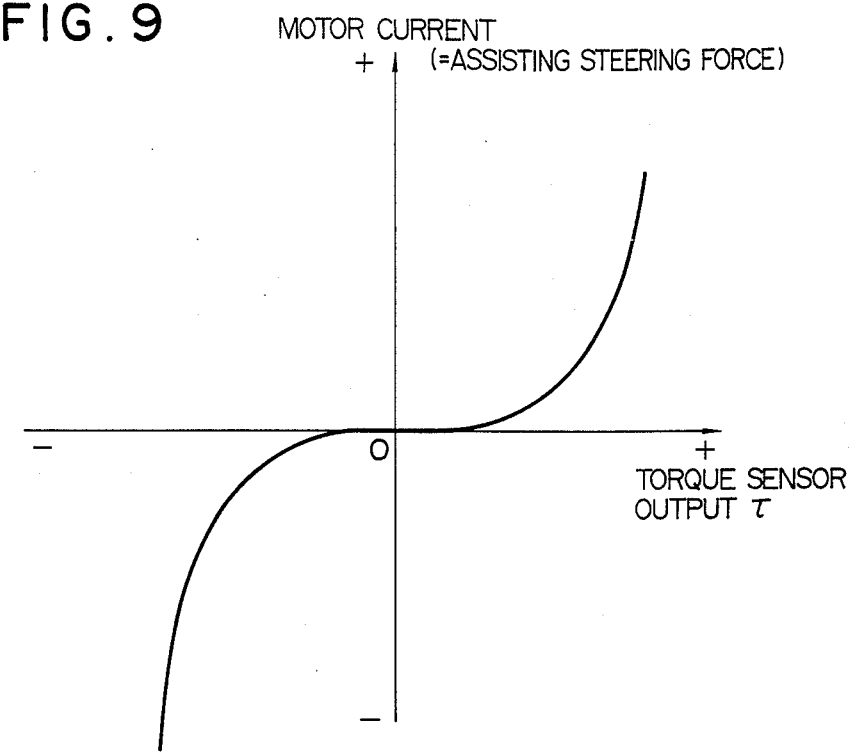
FIG. 9 is a characteristic diagram showing an example of a higher order function characteristic.
Figure 10:
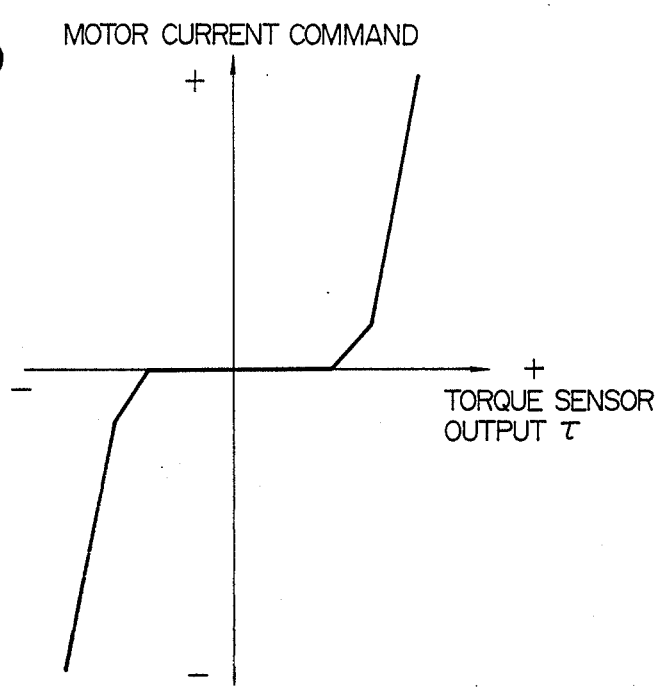
FIGS. 10 and 11 are characteristic diagrams for explaining approximate characteristics with respect to the higher order function characteristic of FIG. 9.
Figure 11:
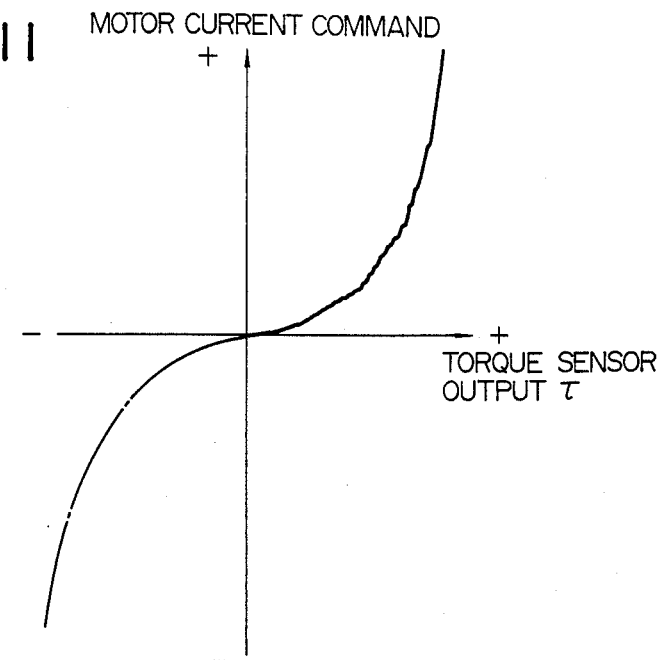

The torque function circuit 21 is provided for this purpose, and it generates an output signal according to the characteristic in FIG. 9 in response to the input signal. Practically, however, since the function circuit which provides the smooth characteristic as shown in FIG. 9 increases the manufacturing cost, or it is difficult to realize such a function circuit, the torque function circuit 21, for example, having an approximate characteristic formed by polygonal line as shown in FIG. 10 may be used. Further, instead of this polygonal line approximation, a characteristic formed by staircase approximation as shown in FIG. 11 may also be used to practice the invention.

The force required to turn the tires 5 to a different direction, that is, the steering force is determined depending on frictional resistance in the turning direction between the tires 5 and the road surface on which the automobile is running, and this frictional resistance is varied depending upon the vehicle speed, and it decreases with increased vehicle speed. Accordingly, the steering force becomes larger when the vehicle speed is lower, and thus, a very large steering force is needed to steer while the automobile is stationary, i.e. the vehicle speed is zero, and it becomes almost impossible to handle the steering wheel.

However, from the practical viewpoint, this steering while the automobile is stationary is necessary when the automobile is to be put into a garage, or the automobile is to be parked between two automobiles aligned back and forth.

On the other hand, since it becomes dangerous when the required steering force is too small while the automobile is running at a high speed, it is desirable to reduce the assisting steering force, or to stop imparting the assisting steering force when the automobile is running at the high speed.

Figure 12:
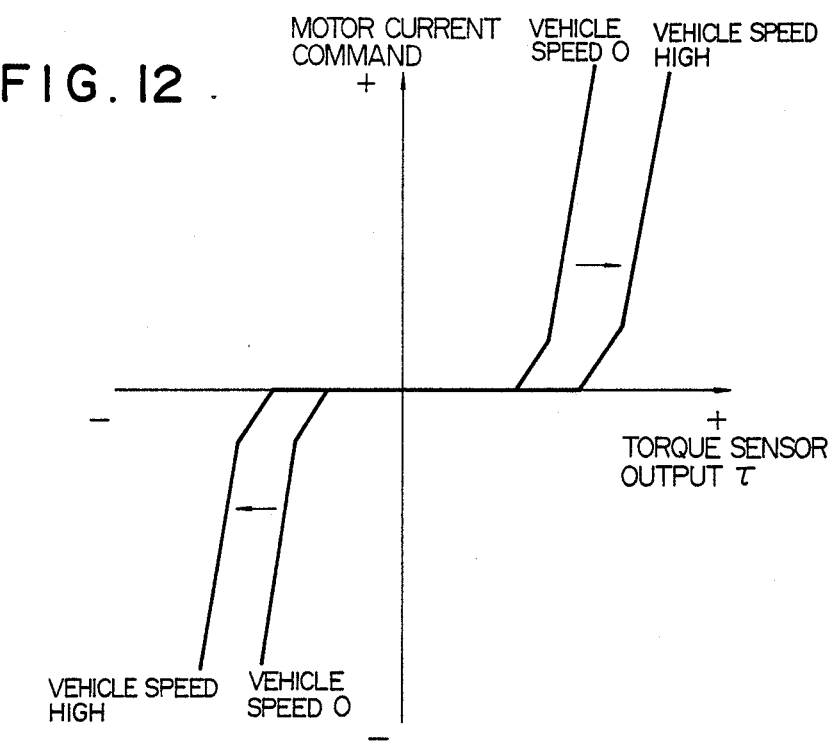
FIG. 12 is a characteristic diagram for explaining an example of a characteristic provided by an embodiment of the present invention.

Accordingly, for this purpose, in the torque function circuit 21, a vehicle speed signal V is inputted from the vehicle speed sensor 20, and the torque signal $\tau$ is dealt with in accordance with a predetermined processing so that the width of the offset of the characteristic provided by the torque function circuit 21 becomes wide depending on the vehicle speed signal V as shown in FIG. 12.

Figure 13:
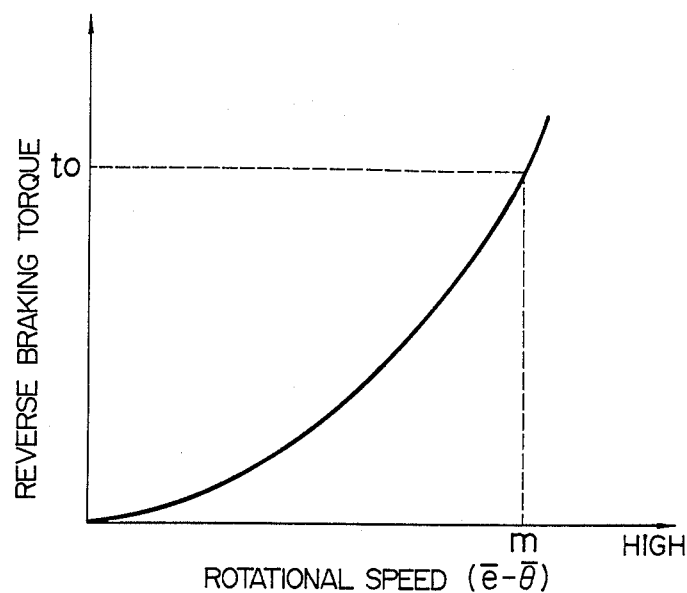
FIG. 13 is a characteristic diagram of a rotational speed-reverse braking torque of the motor.
Figure 14:
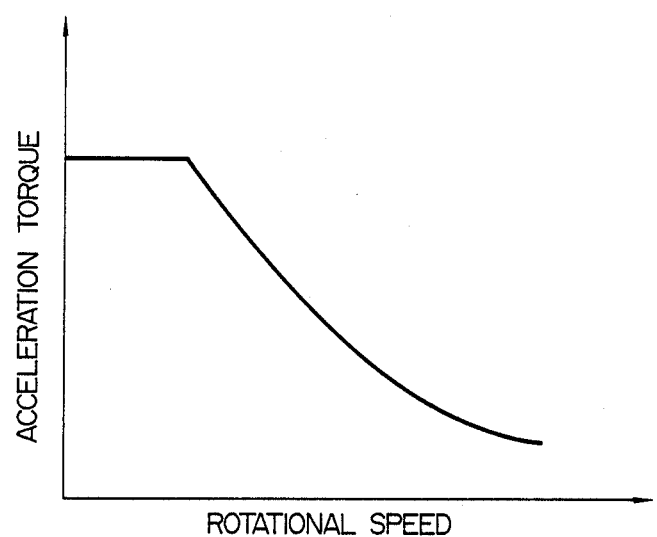
FIG. 14 is a rotational speed-acceleration torque characteristic diagram of the motor.

A relationship between a braking torque applied in a reverse direction to the motor 7, that is, a reverse braking torque and the rotational speed of the motor 7 is represented by the characteristic as shown in FIG. 13. In other words, as the rotational speed of the motor 7 becomes large, the reverse braking torque is increased. Accordingly, a force required to stop at a position by handling the steering wheel (a torque required to stop by braking the motor) is large as the rotational speed of the motor 7 becomes high. Further, the acceleration torque value with respect to the rotational speed of the motor 7 is shown in FIG. 14, and a large acceleration torque is required when the rotational speed of the motor is low.

Figure 15:
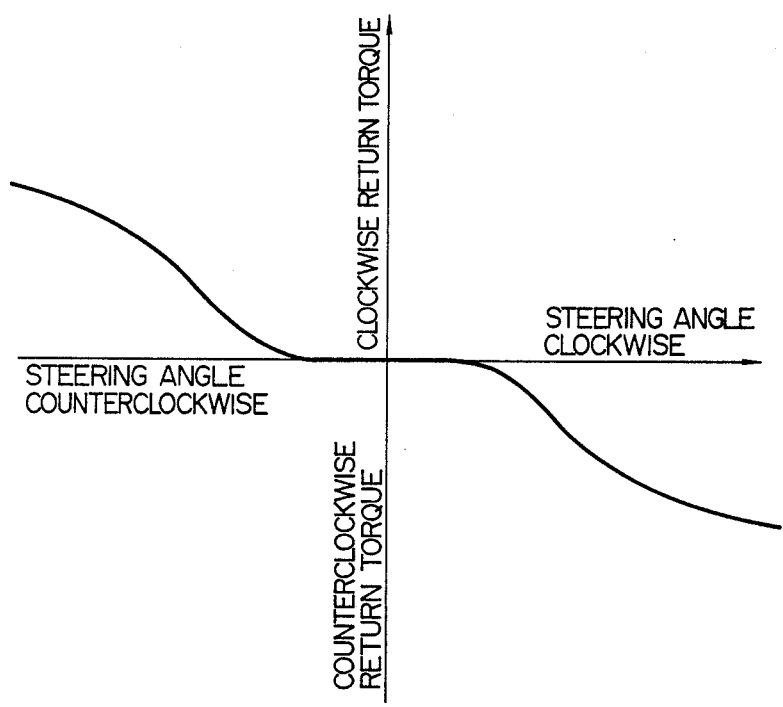
FIG. 15 is a characteristic diagram of a restoring force.

Next, the restoring force function circuit 22 in FIG. 6 will be described. The restoring force function circuit 22 is a circuit which outputs a control signal for the motor 7 so that the tires 5 are provided with a force to return to the original position (a restoring force). A relationship between the return torque and the steering angle (steering angle sensor output) is shown in FIG. 15. In other words, the larger the steering angle, the larger becomes the required torque for restoration. This restoring characteristic is an important factor to determine the steering feeling of a steering system provided with the power steering.

Specifically, the steering system for automobiles is generally designed to provide the restoring characteristic by utilizing the caster effect and the like of the wheels serving to turn to a different direction, and accordingly, it is a widely practiced driving operation to utilize the restoring force exerted to the steering wheel due to the restoring characteristic mentioned above, after a predetermined steering angle has been achieved by handling the steering wheel, and this restoring force is a main factor for providing good steering feeling. For this reason, this restoring force must not be impaired even when the power steering is to be equipped.

Further, the lock detecting circuit 30 in FIG. 6 detects a case in which no output is delivered from the steering angle sensor 10 in connection with the output of the torque sensor 6, and when such a case is detected, a solenoid valve of the clutch 8 is turned off.

Next, the operation of the assisting torque calculation according to an embodiment of the present invention will be explained.

Figure 7:
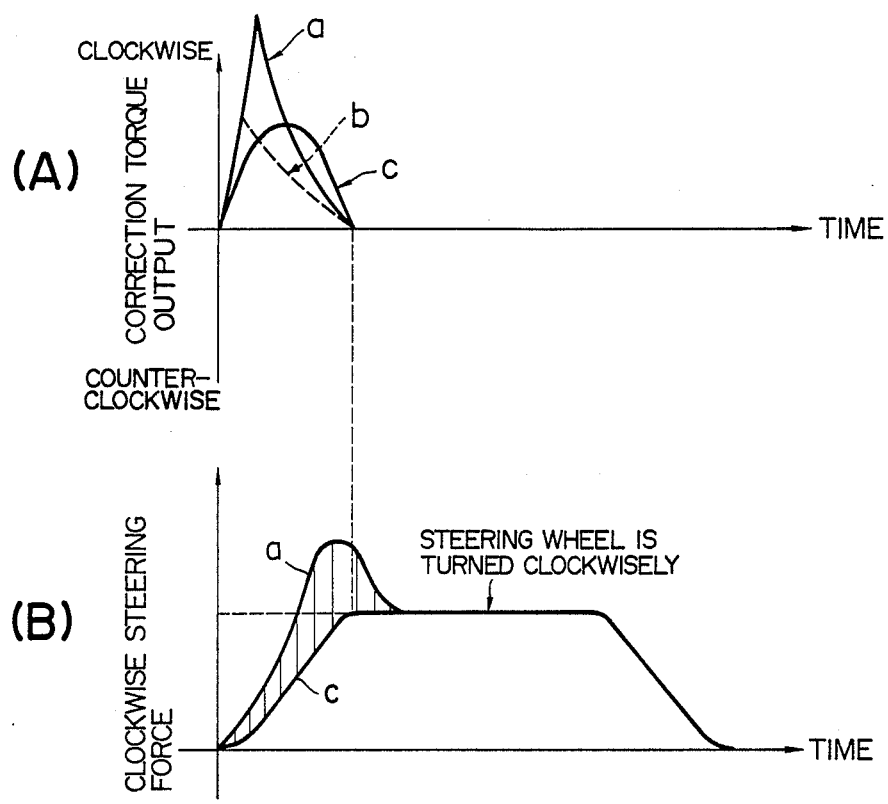
FIG. 7(A) and FIG. 7(B) are characteristic diagrams showing a correction torque output and steering force, respectively.
Figure 16:
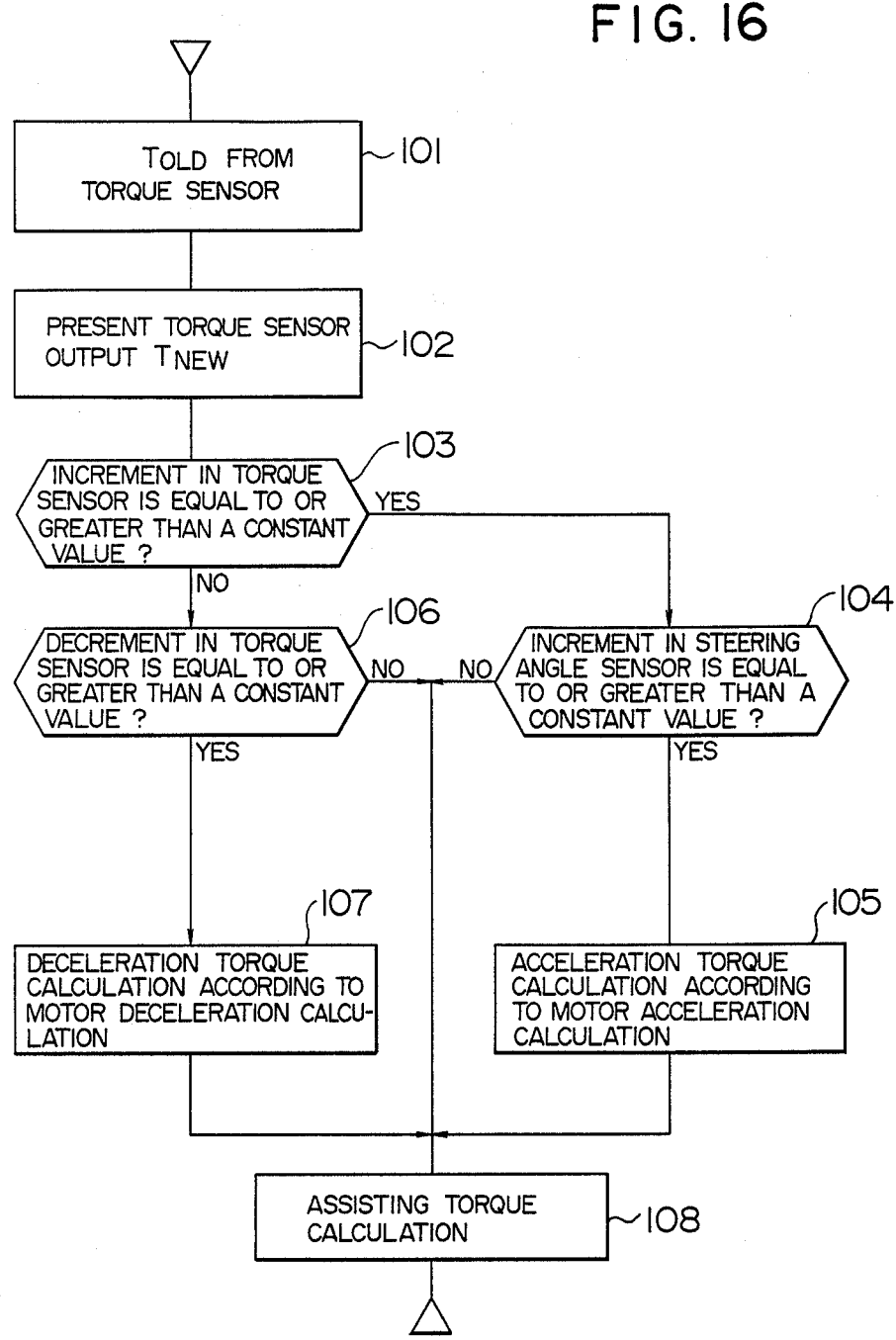
FIG. 16 is an operation flowchart for assisting torque calculation.

FIG. 16 shows a flowchart of the assisting torque calculation. The program of the flowchart is processed by a timer interruption of every 10 msec. First, in step 101, a value $T_{OLD}$ of the last time of the torque sensor 6 is read out, and in step 100 an output value $T_{NEW}$ at the present time from the torque sensor 6 is fetched. Next, the step 103, both values $T_{OLD}$ and $T_{NEW}$ are compared with each other, and it is decided whether or not in increment $\Delta T$ in the output value of the torque sensor 6, i.e., $$\Delta T = T_{NEW} - T_{OLD}$$

is equal to or greater than a constant value. If, in this step 103, the increment in the output value of the torque sensor 6 is decided to be greater than the constant value, then in step 104, it is decided whether or not an increment in a value outputted from the steering angle sensor 10 is equal to or greater than a constant value which corresponds timewisely with the increment in the torque sensor 6. In this step 104, if the increment in the steering angle sensor 10 is not equal to or greater than the constant value, then proceeds to step 108. On the other hand, if, in the step 104, the increment in the steering angle sensor 10 is decided to be equal to or greater than the constant value, then in step 105, an acceleration torque calculation in accordance with a motor acceleration calculation (acceleration to attain the characteristic as shown in FIG. 7) is executed, and proceeds to step 108.

On the other hand, in step 106, if the increment in the torque sensor 6 is decided as being not equal to or greater than the constant value, in step 106, it is decided whether or not the decrement in the torque sensor 6 is equal to or greater than a constant value. In this step 106, if the decrement is decided as being not equal to or greater than the constant value, proceeds to step 108, whereas if the decrement is decided as being equal to or greater than the constant value, in step 107, a deceleration torque calculation according to a motor decleration calculation (corresponding to the reverse braking torque characteristic shown in FIG. 13) is executed and then proceeds to step 108. Next, in step 108, a calculation of the assisting torque as shown in FIG. 12 is executed.

Figure 17:
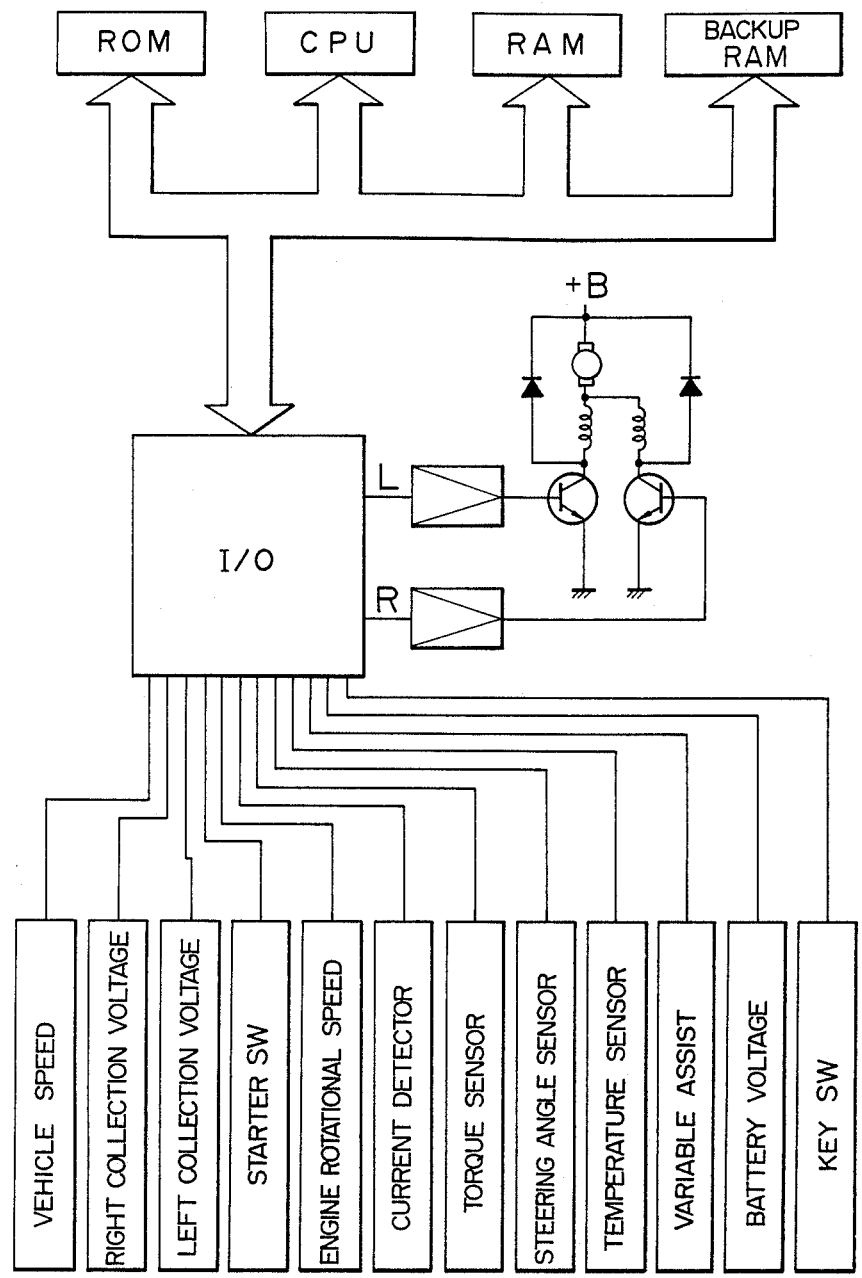
FIG. 17 is a block diagram when a microcomputer is used.
Figure 18:
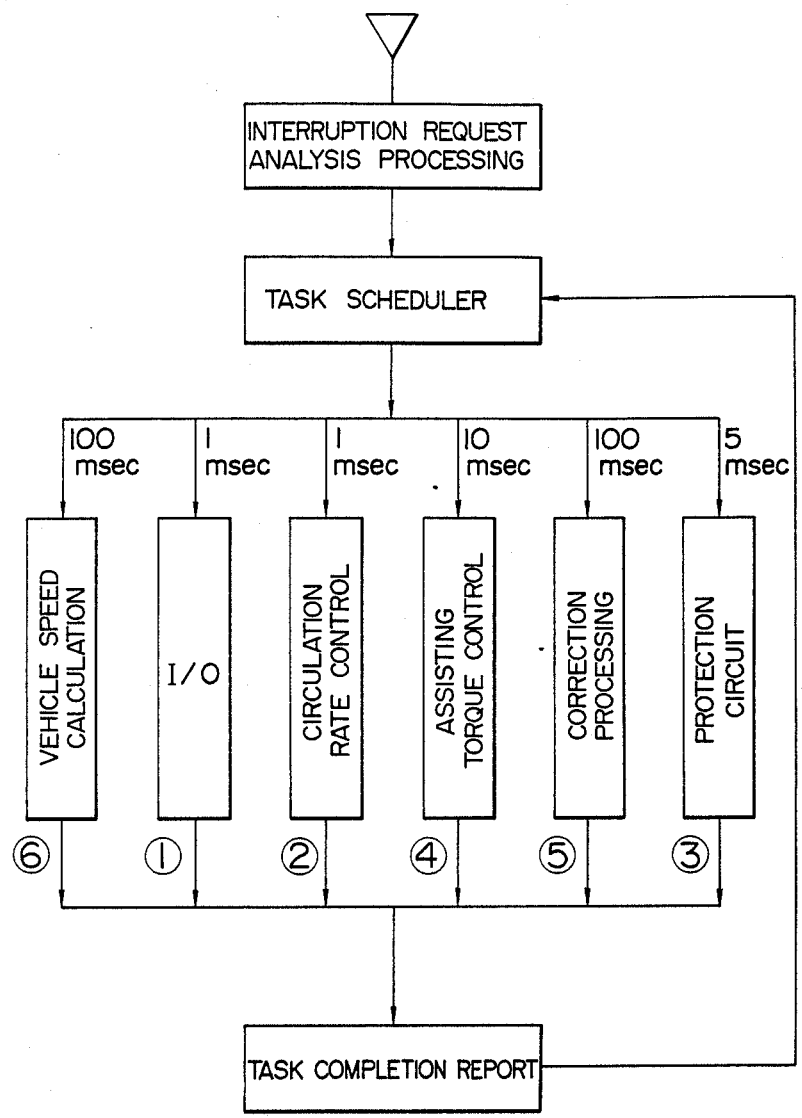
FIG. 18 is a flowchart showing a time schedule of the processing.

In FIG. 17, a series of operations processed by a microcomputer is shown in a block diagram. An interruption flowchart of a task schedule in the processing is shown in FIG. 18.

As described in the foregoing, according to the present invention, it is possible to sufficiently follow the steering speed of the steering wheel.

Next, another embodiment of the present invention is shown in FIGS. 19 to 23.

Figure 19:
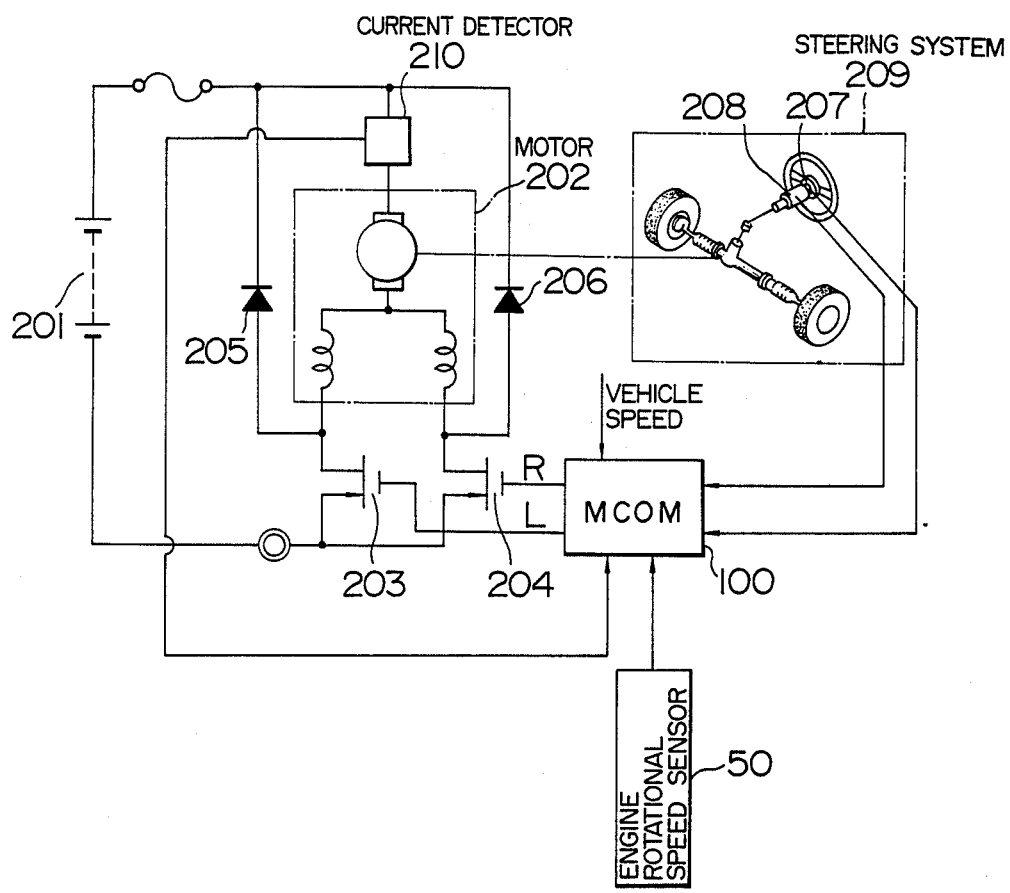
FIGS. 19 to 23 show another embodiment of the present invention.

Referring to FIG. 19, a motor 202 is connected to a battery 201, and this motor 202 is arranged to be able to rotate either clockwisely and counterclockwisely. The drain of an FET203 is connected to an armature for counterclockwise rotation of the motor 202. Further, the drain of this FET203 is connected to the battery 201 through a free wheel diode 205 which is connected forwardly. The source of the FET203 is connected to the battery 201, and the gate is connected to a microcomputer 100. The drain of an FET203 is connected to an armature for clockwise rotation of the motor 202, and this drain is also connected to the battery 201 through a free wheel diode 206 which is connected forwardly. The source of the FET204 is connected to the battery 201, and the gate is connected to the microcomputer 100. The microcomputer 100 is supplied with an output from a sensor 50 for detecting the engine rotational speed, a steering angle from a steering angle meter 207 of a steering system 209, and a rotational torque (steering force) of steering wheel from a torque sensor 209. Further, a signal from a vehicle speed sensor is inputted to the microcomputer 100.

Further, the motor 202 is provided with a current detector 210 for detecting a current supplied to the armature, and a detection value from the current detector 210 is inputted to the microcomputer 100.

Figure 20:
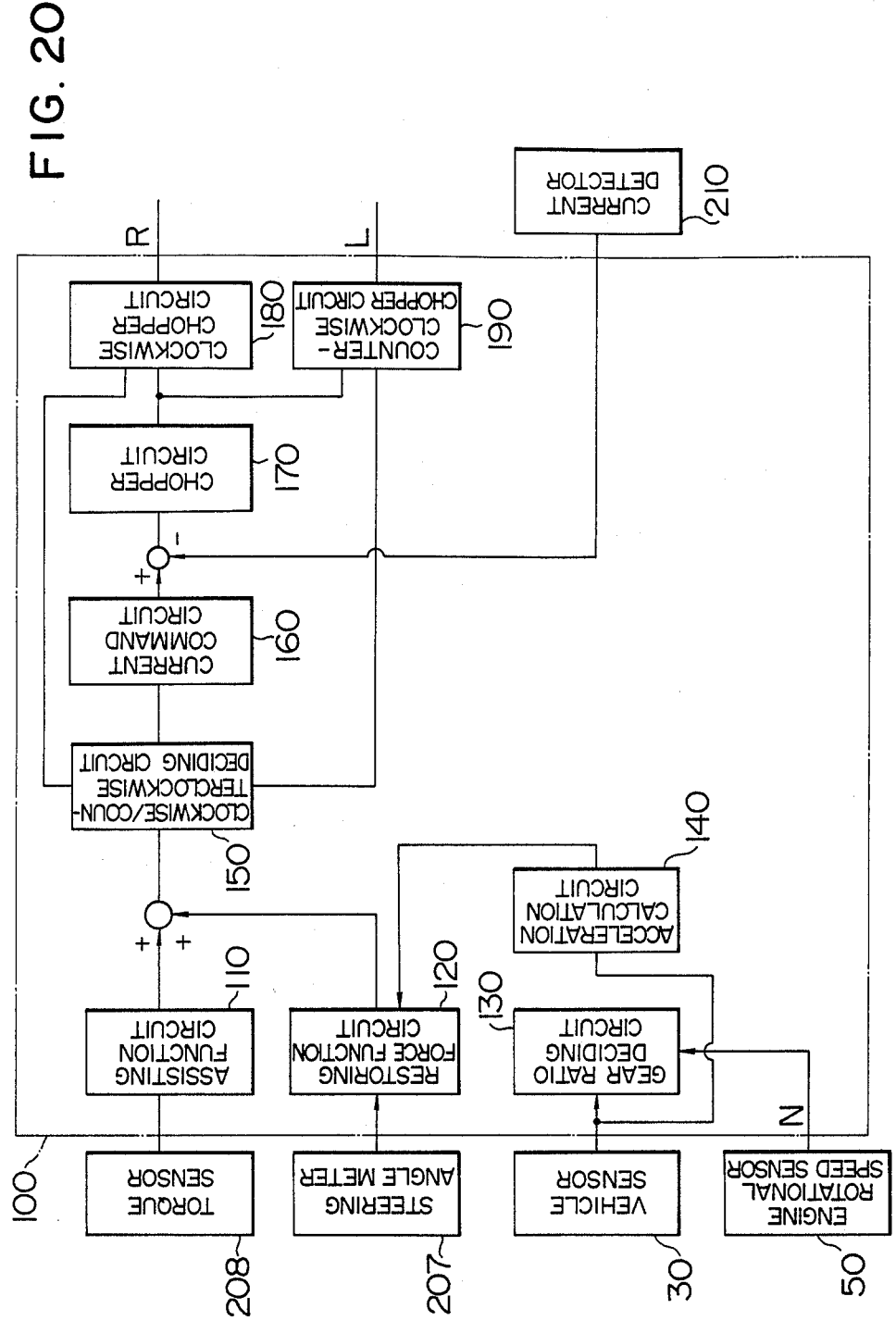

FIG. 20 is a block diagram for explaining the operation of the system shown in FIG. 19.

First, the torque (steering force) detected by the torque sensor 208 is inputted to an assisting function deciding circuit 110, and an assisting function corresponding to the steering force is selected. This assisting function is determined so hat the steering force is maintained constant. From this assisting function deciding circuit 110, a current command corresponding to the assisting force is outputted. On the other hand, based on the amount of steering angle inputted from the steering angle meter 207, a restoring force function is selected in accordance with the steering angle in a restoring force function deciding circuit 120, and a current command corresponding to the restoring force is outputted. This current command is added to the current command from the assisting function deciding circuit 110, and the resultant value is inputted to a clockwise/counterclockwise deciding circuit 150 which decides whether the steering wheel is turned clockwisely or counterclockwisely.

Further, the vehicle speed signal from the vehicle speed sensor 30 is inputted to a gear ratio deciding circuit 130 and an acceleration calculation circuit 140. The engine rotational speed signal from the engine rotational speed sensor 50 is also inputted to the gear ratio deciding circuit 130. The output from the gear ratio deciding circuit 130 and the output from the acceleration calculation circuit1 40 are inputted to the restoring force function deciding circuit 120. Consequently, the restoring force function deciding circuit 120 outputs a value determined by the output from the steering angle sensor 207, the result of the acceleration calculation, and the gear ratio. This, gear ratio calculation is conducted in accordance with the following formula:

$$Gear\ ratio = N/V$$

where, N is the engine rotational speed, and V is the vehicle speed.

By this gear ratio calculation, a back gear is detected. This back gear may be detected by a back switch.

Further, the acceleration calculation for detecting the amount of acceleration is conducted by the formula:

the amount of acceleration $= V_n - V_{n-1}$ where, $V_n$ is the vehicle speed at this time, and $V_{n-1}$ is the vehicle speed at a constant time period before.

Figure 21:
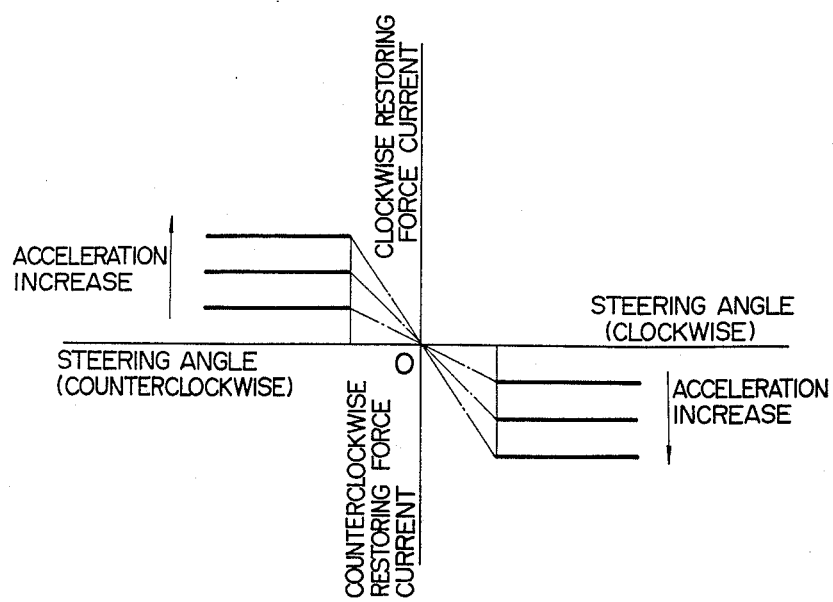

The result of this acceleration calculation is inputted to the restoring force function deciding circuit 120, and a restoring force current is increased in accordance with the characteristic shown in FIG. 21 is proportion to the amount of acceleration. The characteristic map of FIG. 21 is stored in the restoring force function deciding circuit 120. Further, as shown by the chain line in FIG. 21, by using a steering angle sensor capable of detecting the steering angle linearly, this characteristic can be achieved by increasing the restoring force current linearly from the steering angle of zero degree and then by maintaining at a constant value. However, in this embodiment, for detecting the steering angle, a switch which delivers an output when the steering angle reaches a certain steering angle is employed.

The restoring force and the operating force thus obtained are added to each other, and in the clockwise/counterclockwise deciding circuit 150, it is decided whether the motor is to be rotated in a clockwise direction or in a counterclockwise direction, and the output is supplied to either a clockwise chopper 180 or a counterclockwise chopper 190. Further, the composite signal inputted to the clockwise/counterclockwise deciding circuit 150 is inputted to a current command circuit 160, and the inputted signal is converted to an absolute value which is outputted as the current command value. This current command value is compared with the detected current value outputted from a current detector 210, and a difference from the detected current value is supplied to the chopper circuit 170. In this chopper circuit 170, the difference is converted to a chopping signal and the chopping signal is supplied to a clockwise chopper circuit 180 and a counterclockwise chopper circuit 190, and in accordance with the decision signal from the clockwise/counterclockwise deciding circuit 150, either one of the clockwise chopper circuit 180 and the counterclockwise chopper circuit 190 is operated, and the FET203 or the FET204 is chopped.

Figure 22:
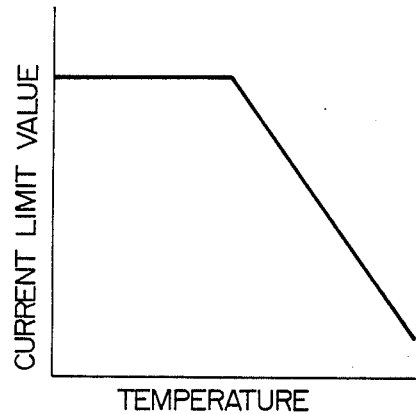
Figure 23:
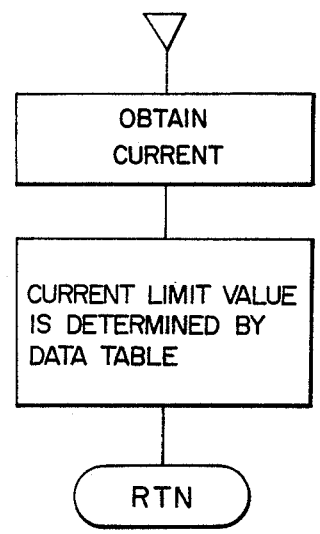

The FETs 203 and 204 will be damaged when the temperature thereof is high. For this reason, there is a limit in the amount of current to be supplied to the FETs 203 and 204 as shown in FIG. 22. This is the current limit value to the temperature of the FETs. Accordingly, it is arranged to supply a current corresponding to the temperature to the motor by detecting the temperature of a power circuit. In other words, a temperature detector is provided in a power section of an electro-motive power steering driving circuit, and a maximum current to be supplied to the motor with respect to the temperature is calculated in the microcomputer 100, and it controls not to supply a current to the motor equal to or greater than the maximum current. This flowchart is shown in FIG. 23.

Therefore, in this embodiment, when the automobile is running with the steering wheel leaving free, the straight advancing direction can always be maintained by the restoring force.

Further, in the embodiment, it is possible to prevent meandering due to irregular oscillations of the steering wheel during running of the automobile.

Moreover, in this embodiment, it is possible to protect the FETs and the motor from being damaged due to temperature rise.

What is claimed is:

1. An electro-motive power steering system comprising:
   a torque sensor for detecting a steering force exerted to a steering wheel;
   a steering angle sensor for detecting a steering angle effected by rotation of said steering wheel;
   acceleration/deceleration deciding means for deciding based on the outputs of said torque sensor and said steering angle sensor whether the steering of said steering wheel is accelerated or decelerated;
   acceleration/deceleration function generating means for generating either a function relating to the acceleration or the deceleration in accordance with the result of said deciding means; and
   means for providing an assisting force to the steering wheel in accordance with a steering speed of the steering wheel on the basis of the function generated by said acceleration/deceleration function generating means.

2. A system according to claim 1, wherein said acceleration/deceleration function generating means includes a microcomputer.

3. A system according to claim 1, further comprising means for generating a restoring force function in accordance with the output of said steering angle sensor, and wherein said assisting force providing means provides the steering assisting force to the steering wheel in accordance with the restoring force function generated by said restoring force function generating means and the function generated by said acceleration/deceleration function generating means.

* * * * *